A. J. Holt.
Seed-Planter.
N° 82524.     Patented Sept. 29, 1868
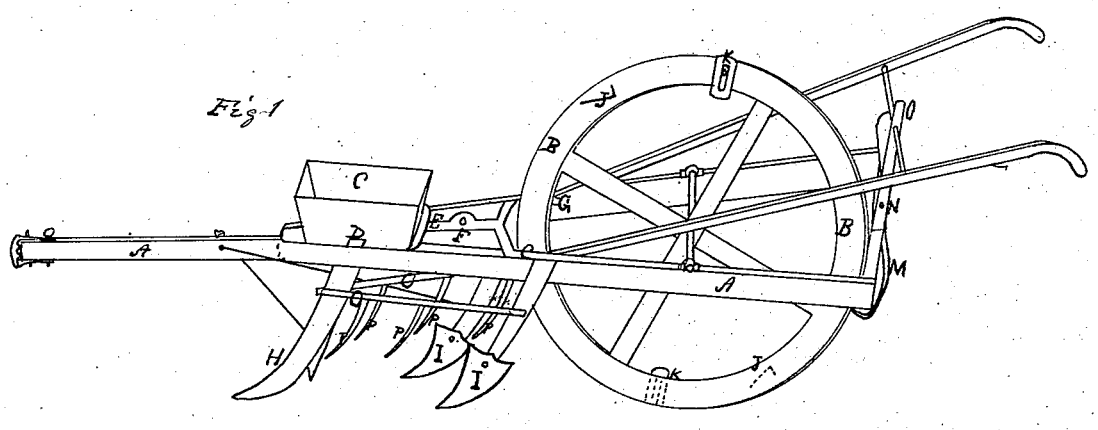
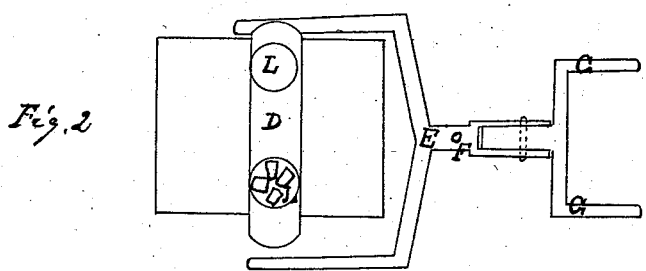
Witnesses
Ja. M. Brown
Jas. A. Tyner
Andrew J Holt United States Patent Office.

ANDREW J. HOLT, OF PERU, INDIANA.

Letters Patent No. 82,524, dated September 29, 1868.

---

IMPROVEMENT IN SEED-PLANTERS.

---

The Schedule referred to in these Letters Patent and making part of the same.

---

TO ALL WHOM IT MAY CONCERN:

Be it known that I, ANDREW J. HOLT, of Peru, in the county of Miami, and State of Indiana, have invented an Improved Grain-Planter, to be known as "Holt's Improved Grain-Planter," for the speedy and accurate planting of grain.

The nature of my invention consists in providing the "grain-planter" with a hinged lever, for moving the horizontal dropping-bar, and disconnecting it with the wheel of the planter; the peculiar mode, in combination with other devices named, of using inclined planes to produce a lateral movement of the dropping-bar; the use of markers, attached to the wheel, to indicate the precise point at which the grain is deposited; and the use of a rod, to check at will the revolution of the wheel.

To enable others to make and use my invention, I will proceed to describe its construction and operation.

I construct my planter with a shovel, H, which is connected with the deposit-box C by a hollow tube, through which the grain passes. On the under side of said box I fit a horizontal bar, D, Figure 2, with holes of any desired size, to receive the grain, which bar passes in a horizontal direction over corresponding holes in the bottom of said box. The bar is moved, on the revolution of the wheel B, by the hinged lever E G, the forward arms of which pass alternately against the dropping-bar D. The backward arms G G of the hinged lever fall each side of the wheel B, Figure 1, and are moved by inclined planes J J, attached to the sides of the wheel, and thus produce the necessary lateral motion of the dropping-bar to secure the discharge of grain through the holes in the bottom of the box.

The wheel B is constructed of any desired size, so that one revolution will mark the necessary distances for the planting of two hills of grain. For the purpose of drilling, any additional number of inclined planes may be alternately placed, at proper distances, on the sides of the wheel. Adjustable markers, K K, are so placed, at regular distances on the sides of the wheel, as to indent the ground at the points where the grain is deposited.

A rod, M, is attached to the planter, and passes down between the handles, with a sharpened point, to catch in grooves or holes in the outer rim of the wheel, and arrest the same at pleasure.

Two shovels, I I, are attached to the framework, back of and outward from the tube through which the grain drops, for the purpose of covering the grain, and also small teeth, P P, which are used to prevent clods from falling on the planted grain.

The hinged lever E G, fig. 2, is so constructed that the arms G G may be thrown from the wheel when not planting.

What I claim as my invention, and desire to secure by Letters Patent, is—

1. The hinged lever E G, for moving the horizontal dropping-bar D, and its mode of disconnection with the wheel B.
2. In combination with the above-named devices, I claim the mode of applying and using the inclined planes J J, so as to produce the lateral alternate movement of the dropping-bar D, through the medium of the lever E G.
3. The adjustable markers K K, for the purpose of showing the point where the grain is deposited; and
4. The application of the rod M, for arresting the revolution of the wheel B at the point of dropping.

Witness my hand, this 31st day of July, A. D. 1868.

ANDREW J. HOLT.

Witnesses:
   JAS. N. TYNER,
   J. W. ELLIS.